(No Model.)

L. R. CARHART.
SLEIGH TRUCK.

No. 396,646. Patented Jan. 22, 1889.

WITNESSES:
Walter E. Ward.
Seymour N. Harris.

INVENTOR.
L. Romaine Carhart
BY Frederick W. Cameron.
ATTORNEY.

UNITED STATES PATENT OFFICE.

LEONARD ROMAINE CARHART, OF COEYMANS, NEW YORK.

SLEIGH-TRUCK.

SPECIFICATION forming part of Letters Patent No. 396,646, dated January 22, 1889.

Application filed June 1, 1888. Serial No. 275,710. (No model.)

*To all whom it may concern:*

Be it known that I, LEONARD ROMAINE CARHART, a citizen of the United States, residing at Coeymans, in the county of Albany and State of New York, have invented a new and useful Sleigh-Truck, of which the following is a specification.

My invention relates to machinery and tools for handling ice; and the object of my invention is to provide a sleigh-truck by means of which large cakes of ice may be easily moved and carried from one part of an ice-house to another. I attain this object by the mechanism illustrated in the accompanying drawings, in which—

Figures 1, 2:
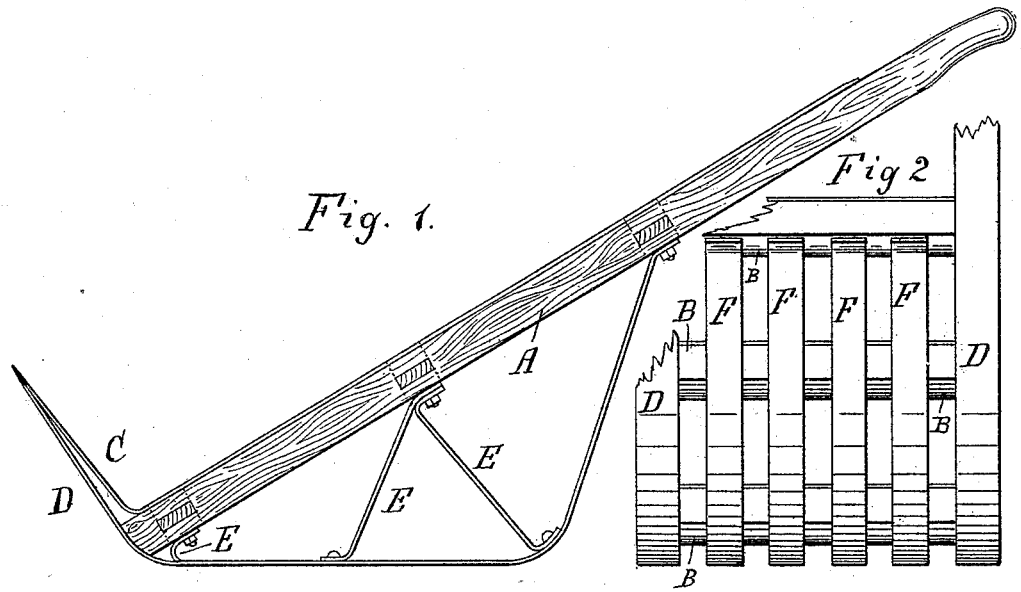
Figure 3:
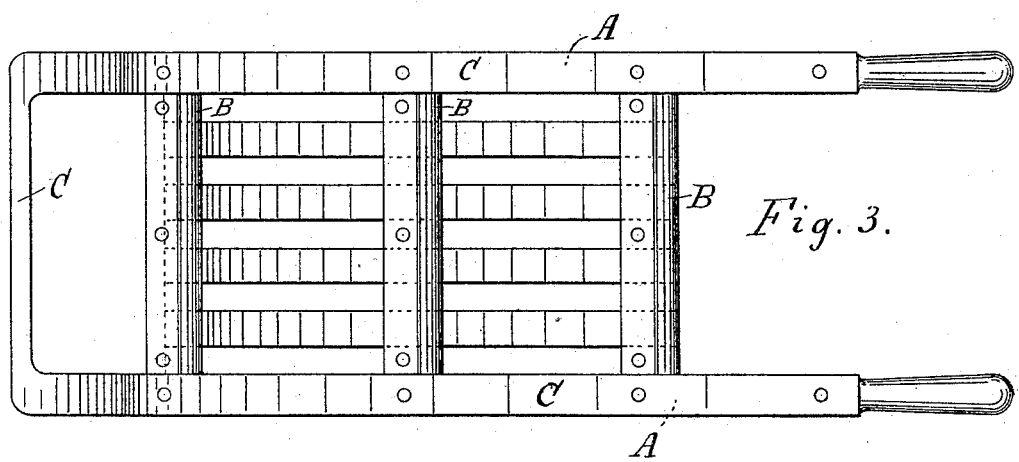

Figure 1 is a side elevation; Fig. 2, a plan of the reverse side of a part of the truck; and Fig. 3 is a plan of the truck.

Similar letters refer to similar parts throughout the several views.

The frame of my sleigh-truck consists of two side bars, A A, each having one end turned to make convenient handles. From one side bar to the other the cross-pieces B B are extended, having their ends securely fastened to the side bars, A A, by mortise or in suitable manner. To the upper surface of each side bar I attach by screw or bolt the metal strip C, which is bent near the end of the side bar and extends above and across from one side bar to the other, as shown in Figs. 1 and 3.

To the under side of the side bar, A, I attach, by bolt or in any suitable manner, the runners D D, constructed of steel or other suitable metal. The runners D D extend downward from the side bars, A A, and are bent at an angle and extend to the ends of the side bars, A A, opposite the handles, and are then bent upward, meeting and secured to the metal strip C, and extending across from one side bar to the other, but at a short distance above the side bar, in the same manner as and connected by rivets or by weldings to the metal bar C. The runners D D are held steadfastly in position by the braces E E, extending from the side bars, A A, and attached to the runners D D. The runners may be made in one strip attached to each side bar, and extending across from one to the other, being attached at the end to the strip C.

To the cross-piece B nearest the handles and to the cross-piece B nearest the opposite end of the side bar I attach the ends of the runners F F F, which runners are suitably braced and correspond with the runners D D, except that they do not extend above the side bars.

My sleigh-truck is very like the hand-truck commonly used in warehouses, except that it is provided with runners and can be used in ice-houses.

In operation the curved bar or strip C is placed underneath the cake of ice, which is then tipped so as to balance back slightly against the side bars and cross-pieces, in which position it is transported upon the runners.

I do not limit myself to the number of runners or to the number of cross-pieces shown in the drawings.

What I claim as my invention, and desire to secure by Letters Patent, is—

1. In a sleigh-truck, the combination of the side bars, A A, having attached to the upper portion thereof the metal bar C, said bar C being curved and extending above the side bars, A A, with the runners D D, attached to the side bars, A A, and to the metal bar C above the side bars, A A, substantially as described, and for the purpose set forth.

2. In a sleigh-truck, the combination of the side bars, A A, secured together by the cross-pieces B B, having attached to the upper portion of the said side bars the metal bar C, said bar being curved and extending above the side bars, A A, with the runners D D, attached to the side bars, A A, and to the metal bar C above the side bars, with the runners F F, attached to the cross-bars B B between the runners D D, substantially as described, and for the purpose set forth.

L. ROMAINE CARHART.

Witnesses:
FREDERICK W. CAMERON,
WALTER E. WARD.